(12) United States Patent
Brown et al.

(10) Patent No.: US 8,938,108 B2
(45) Date of Patent: Jan. 20, 2015

(54) METHOD FOR ARTIFACT REDUCTION IN CONE-BEAM CT IMAGES

(75) Inventors: Kevin M. Brown, Mentor on the Lake, OH (US); Stanislav Zabic, Highland Heights, OH (US)

(73) Assignee: Koninklijke Philips N.V., Eindhoven (NL)

( * ) Notice: Subject to any disclaimer, the term of this patent is extended or adjusted under 35 U.S.C. 154(b) by 449 days.

(21) Appl. No.: 13/496,317

(22) PCT Filed: Sep. 16, 2010

(86) PCT No.: PCT/IB2010/054190
§ 371 (c)(1),
(2), (4) Date: Mar. 15, 2012

(87) PCT Pub. No.: WO2011/042821
PCT Pub. Date: Apr. 14, 2011

(65) Prior Publication Data
US 2012/0183194 A1    Jul. 19, 2012

Related U.S. Application Data

(60) Provisional application No. 61/249,041, filed on Oct. 6, 2009.

(51) Int. Cl.
G06K 9/00 (2006.01)
G06T 11/00 (2006.01)

(52) U.S. Cl.
CPC .................................. G06T 11/008 (2013.01)
USPC .......... 382/131; 382/128; 382/254; 382/275; 600/544; 378/4; 250/363.07

(58) Field of Classification Search
None
See application file for complete search history.

(56) References Cited

U.S. PATENT DOCUMENTS

| 4,931,645 | A | 6/1990 | Welsh |
| 2005/0226365 | A1 | 10/2005 | Taguchi |
| 2006/0029285 | A1 | 2/2006 | Hein et al. |
| 2008/0093559 | A1 | 4/2008 | Dorscheid et al. |
| 2008/0118022 | A1* | 5/2008 | Hagiwara ........................ 378/4 |
| 2009/0016485 | A1* | 1/2009 | Nakanishi et al. ............. 378/19 |
| 2009/0116721 | A1 | 5/2009 | Zamyatin et al. |

FOREIGN PATENT DOCUMENTS

| EP | 1714254 B1 | 12/2007 |
| EP | 2014232 A2 | 1/2009 |
| WO | 2005073922 A1 | 8/2005 |

OTHER PUBLICATIONS

Hsieh, J.; A Practical Cone Beam Artifact Correction Algorithm; 2000; IEEE Trans. on Nuclear Science Symposium; vol. 2:15_71-15_74.

(Continued)

*Primary Examiner* — Matthew Bella
*Assistant Examiner* — Jason Heidemann

(57) ABSTRACT

A method includes reducing structured artifacts in 3D volumetric image data, which is generated with reconstructed projection data produced by an imaging system (100), by processing the 3D volumetric image data along a z-axis (108) direction. The 3D volumetric image data includes structured artifacts which have high-frequency components in the z-axis direction, and lower-frequency compounds within the x-y plane.

23 Claims, 4 Drawing Sheets

(56) References Cited

OTHER PUBLICATIONS

Rudin, L. I., et al.; Nonlinear total variation based noise removal algorithms; 1992; Physica; D 60:259-268.

* cited by examiner

METHOD FOR ARTIFACT REDUCTION IN CONE-BEAM CT IMAGES

CROSS REFERENCE TO RELATED APPLICATIONS

This application claims the benefit of U.S. provisional application Ser. No. 61/249,041 filed Oct. 6, 2009, which is incorporated herein by reference.

The following generally relates to artifact reduction in images generated from reconstructed projection data (three-dimensional (3D) volumetric image data) and finds particular application to computed tomography (CT). However, it also amenable to other medical imaging applications and to non-medical imaging applications.

A multi-slice computed tomography (CT) scanner includes an x-ray tube mounted on a rotatable gantry that rotates around an examination region about a longitudinal or z-axis. The x-ray tube emits radiation that traverses the examination region and a subject or object therein. A two-dimensional detector array subtends an angular arc opposite the examination region from the x-ray tube. The detector array includes a plurality of rows of detectors that are aligned with respect to each other and that extend along the z-axis. The detectors detect radiation that traverses the examination region and generates projection data indicative thereof. A reconstructor processes the projection data and reconstructs three-dimensional (3D) volumetric image data indicative thereof. The volumetric image data is processed to generate one or more images of the subject or object.

Unfortunately, images reconstructed from projection data (three-dimensional (3D) volumetric image data) using thin slice protocols contain artifacts due to under-sampling (based on the Nyquist-Shannon sampling theorem) in the z-axis (or detector-row) direction. The artifacts have been referred to in the literature as "splay" or "windmill" artifacts. One approach to reducing such artifacts is to reconstruct thicker slices (e.g., two times the acquisition thickness) so that the Nyquist sampling criteria is met. However, this results in an undesirable blurring of the z-resolution of the image.

Another approach includes shifting the focal spot of the x-ray tube in the z-direction between each integration period of the data acquisition, such that the detector positions are essentially staggered by ½ of a detector row between each integration period. Unfortunately, this requires significant technology development in the x-ray tube and is not applicable to older scanners without significantly increasing the cost of the tube. Another approach is to adaptively upsample the data to dynamically smooth large gradients detected in the projection data. However, such smoothing of gradients may result in blurring of fine structures in the reconstructed images.

Aspects of the present application address the above-referenced matters and others.

According to one aspect, a method includes reducing structured artifacts in 3D volumetric image data, which is generated with reconstructed projection data produced by an imaging system, by processing the 3D volumetric image data along a z-axis direction. The 3D volumetric image data includes structured artifacts which have high-frequency components in the z-axis direction, and lower-frequency components within the x-y plane.

In another embodiment, a computer readable storage medium contains instructions which, when executed by a computer, cause the computer to perform the act of: processing 3D volumetric image data along a z-axis direction to remove higher frequency components corresponding to structured artifacts to reduce the structured artifacts in the 3D volumetric image data, wherein the 3D volumetric image data is generated with reconstructed projection data produced by an imaging system.

In another embodiment, an artifact reducer includes a de-noiser processor that de-noises selected first data from a copy of 3D volumetric image data along a z-axis direction and then de-noises selected second data from the copy of the 3D volumetric image data in an x-y plane. The artifact reducer further includes a subtractor processor that subtracts the de-noised z-axis direction data from the copy of the 3D volumetric image data prior to selecting and de-noising the data in the x-y plane and that subtracts the de-noised second data from the 3D volumetric image data after the de-noised z-axis data is substituted into the copy of the 3D volumetric image data.

According to another aspect, a method includes subtracting a set of de-noised axial slices from 3D volumetric image data, wherein the de-noised axial slices restore higher frequency components to the image data, including noise, that do not correspond to structured artifacts.

The invention may take form in various components and arrangements of components, and in various steps and arrangements of steps. The drawings are only for purposes of illustrating the preferred embodiments and are not to be construed as limiting the invention.

Figure 1:
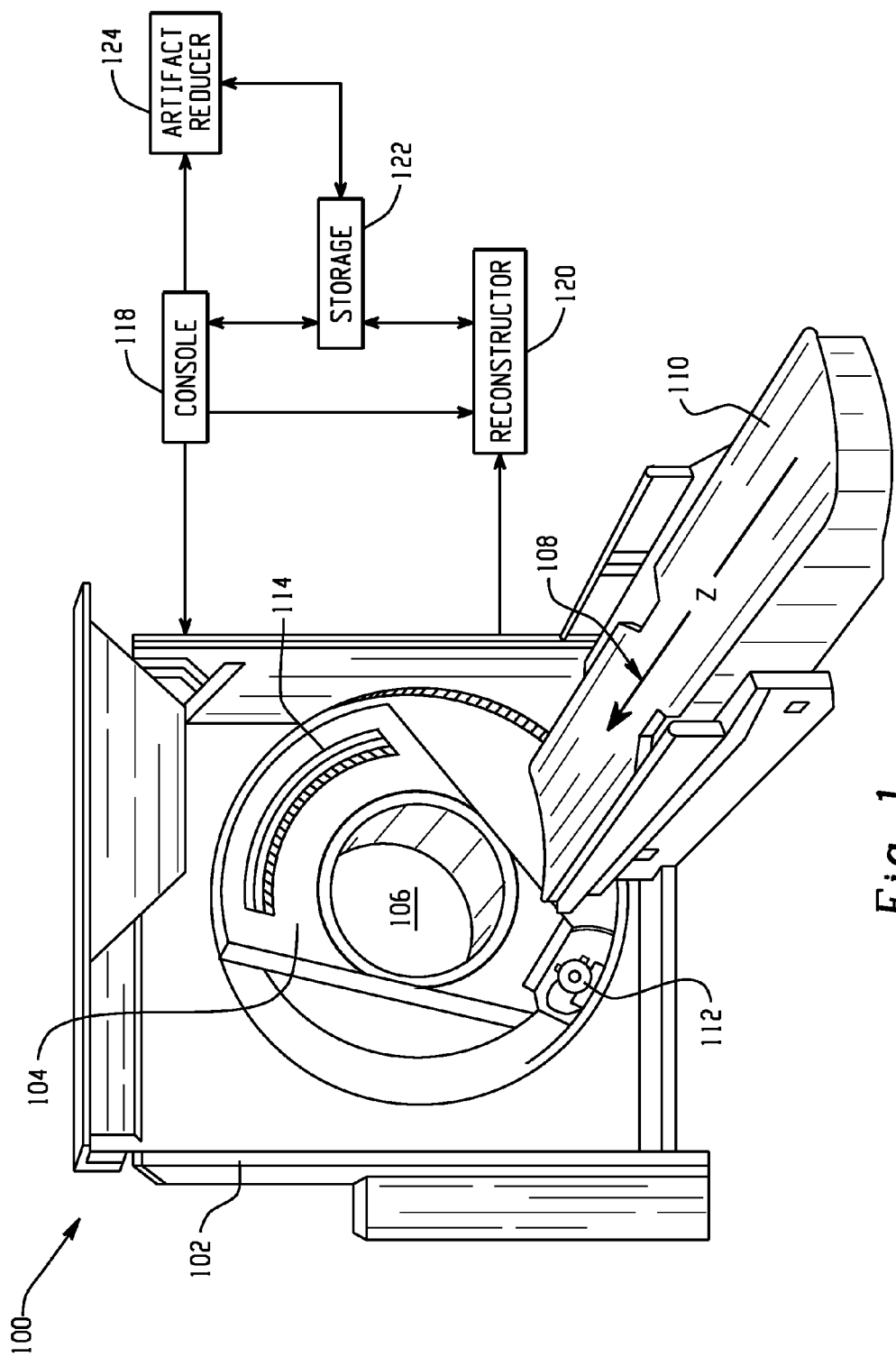
FIG. 1 illustrates an example imaging system in connection with an artifact reducer that reduces artifacts in 3D volumetric image data.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis 108. A patient support 110, such as a couch, supports an object or subject such as a human patient in the examination region 106.

A radiation source 112, such as an x-ray tube, is supported by the rotating gantry 104. The radiation source 112 emits radiation from a focal spot and the radiation traverses the examination region 106. A source collimator collimates the radiation to form a generally cone, wedge, fan or other shaped radiation beam. A two-dimensional radiation sensitive detector array 114 subtends an angular arc opposite the radiation source 112 across the examination region 106. The detector array 114 includes a plurality of rows of detectors that extend along the z-axis 108 direction. The detector array 114 detects radiation traversing the examination region 106 and generates projection data indicative thereof. The illustrated radiation source 112 is configured so that the focal spot can shift, via a controller or the like, in the axial or x/y plane (transverse to the z-axis) between data acquisition integration periods by a half of a detector row.

A general-purpose computing system or computer serves as an operator console 118. A processor of the console 118 executes computer readable instructions on the console 118, which allows the operator to control operation of the system 100 such as selecting a scan protocol (e.g., a higher resolution, thinner slice protocol), activating and deactivating focal spot shifting in the x/y plane, initiating scanning, terminating scanning, etc.

A reconstructor 120 reconstructs the projection data and generates three-dimensional (3D) volumetric image data indicative thereof. Where a higher resolution, thinner slice protocol is used (e.g., slice thickness between one and two times the size of the detector row), the 3D volumetric image data may include artifacts which have higher frequency components along the z-axis direction and lower frequency components in the x-y plane. In one instance, higher frequency refers to artifacts, which have a strong image-to-image variation or vary strongly by every other image in the z-direction, and low-frequency refers to artifacts that are relatively constant for groups of two or four pixels in the x-y image. Storage 122 can be used to store the 3D volumetric image data. The storage 122 can include local or remote memory or other memory such as portable memory, etc.

An artifact reducer 124 reduces artifacts in the 3D volumetric image data, including artifacts due to under-sampling along the z-axis such as structured artifacts like windmill (or splay) artifacts. As described in greater detail below, this includes processing the 3D volumetric image data to reduce higher frequency components that correspond to the structured artifacts in the z-axis directions while preserving other higher frequency components. This allows for reducing structured artifact while retaining z-axis resolution of structure with high z-gradients (fine details). The artifact reducer 124 can be implemented as computer readable instructions executed by a processor.

It will be recognized that a similar process can be used to eliminate any artifacts which can be isolated such that there exists at least one plane in which the artifacts are high-frequency and some other plane in which the artifacts are low-frequency. As an example, in a CT system without x-y focal spot deflection, aliasing artifacts can occur which are high-frequency in the x-y plane. For such artifacts which have low frequency variations in the z-directions, the artifact reducer 124 can be used to reduce these artifacts by processing first the x-y plane, forming difference images, and then by processing x-z or y-z planes of the difference image data.

In the illustrated embodiment, the artifact reducer 124 is part of the system 100, but separate from the console 118. In another embodiment, the artifact reducer 124 is part of the console 118. In yet another embodiment, the artifact reducer 124 is located remote from the system 100, for example, in a workstation outside of the exam room in which the system 100 is located. In still another embodiment, the artifact reducer 124 is part of the reconstructor 120.

Figure 2:
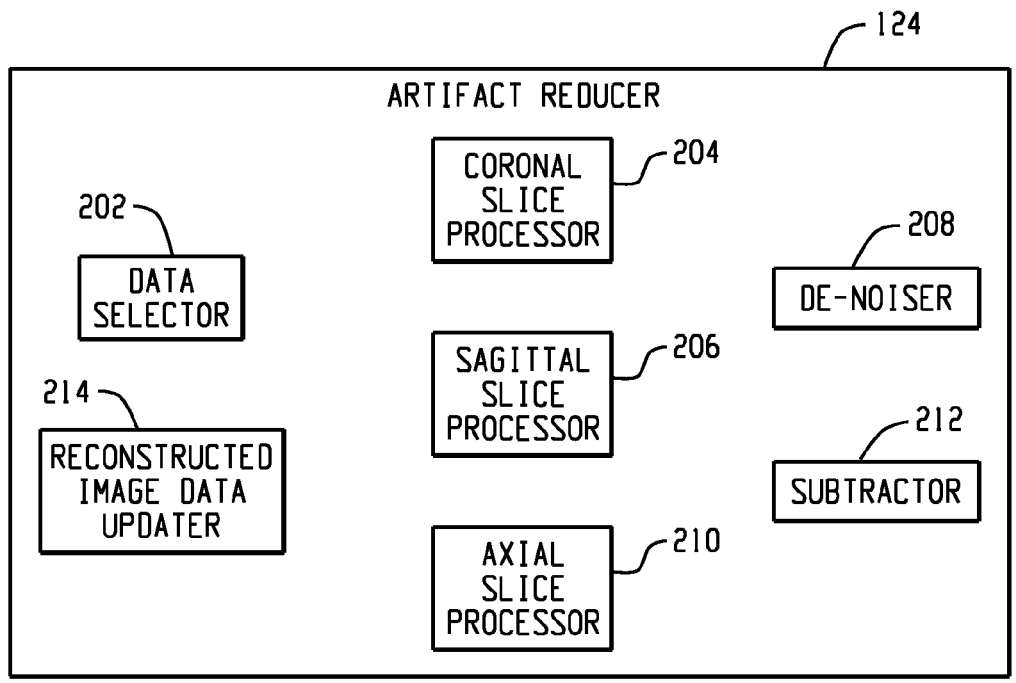
FIG. 2 illustrates an example of the artifact reducer of FIG. 1 that processes coronal and sagittal slices to reduce the artifact.

FIG. 2 illustrates an example of the artifact reducer 124. A data selector 202 selectively selects a subset of images in the 3D volumetric image data, containing a minimum number of images that may depend on the particular de-nosing algorithm chosen. The illustrated data selector 202 is configured to alternately select between coronal, sagittal, and axial slices in the 3D volumetric image data.

A coronal slice processor 204 generates a copy of the selected coronal slices, and a sagittal slice processor 206 generates a copy of the selected sagittal slices. The processors 204 and 206 employ a de-noiser 208 to remove noise as well as structured artifact from the copy of the (or the originally selected) coronal and sagittal slices. An axial slice processor 210 employs the de-noiser 208 to de-noise selected axial slices.

In the illustrated embodiment, the de-noiser 208 is based on the Rudin/Osher/Fatemi algorithm described in L. Rudin, S. Osher and E. Fatemi, "Nonlinear total variation based noise removal algorithms," Physica D 60, 259-268, 1992. Other embodiments may employ other algorithms (e.g., low pass filtering, non-linear adaptive filtering, image regularization, non-linear de-noising, etc.) that reduce the higher frequency components corresponding to the structured artifact while preserving real edges in the underlying images.

A subtractor 212 subtracts the de-noised copy of the (or the originally selected) coronal and sagittal slices respectively from the originally selected (or the copy of the) coronal and sagittal slices, forming difference coronal and sagittal slices. The difference slices represent the artifacts removed from the originally selected coronal and sagittal slices. The subtraction can be simple subtraction or a weighted subtraction.

A reconstructed image data updater 214 replaces the coronal and sagittal slices in the working copy of the 3D volumetric image data with the difference coronal and sagittal slices.

The subtractor 212 also subtracts the de-noised axial slices from the 3D volumetric image data with the replacement difference coronal and sagittal slices. In one instance, this has the effect of restoring high-frequency components that do not correspond to the structured artifact but were removed by de-noising of the coronal and sagittal slices. In some cases, this may facilitate restoring visually pleasing components that were removed during de-noising of the coronal and sagittal slices.

In FIG. 2, the coronal slices are processed and inserted in the 3D volumetric image data before the sagittal slices are selected from the 3D volumetric image data. In another embodiment, the order is reversed, and the sagittal slices are processed and inserted into the 3D volumetric image data before the coronal slices are selected from the 3D volumetric image data. In either instance, the axial slices are selected and processed after the coronal and sagittal difference slices are inserted into the 3D volumetric image data.

In the above example, the de-noised coronal and/or sagittal slices are used to generate difference coronal and/or sagittal slices that are substituted in the 3D volumetric image data. In another embodiment, the de-noised coronal and/or sagittal slices are directly subtracted from the 3D volumetric image data.

Figure 3:
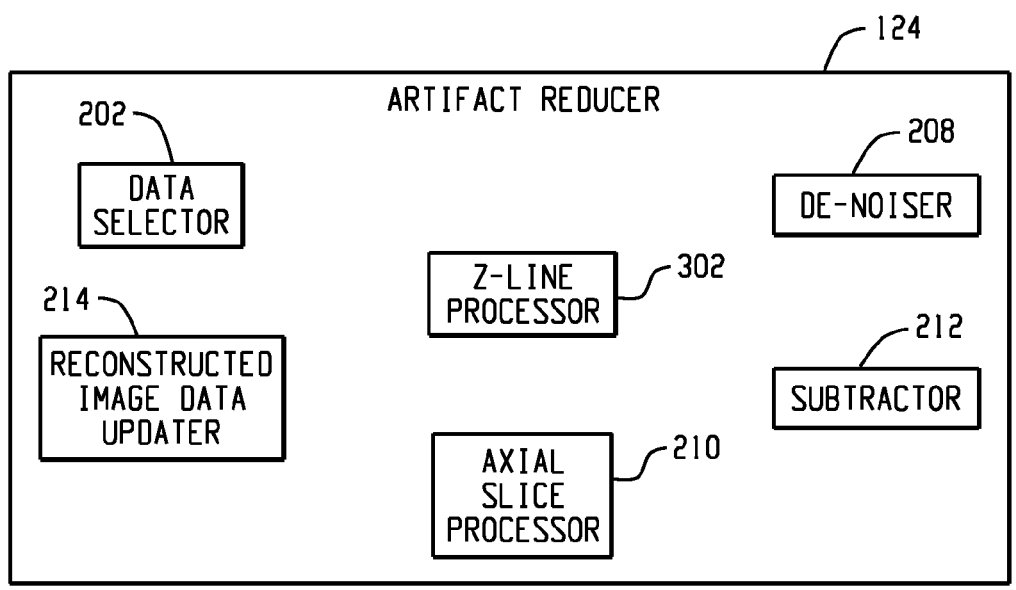
FIG. 3 illustrates an example of the artifact reducer of FIG. 1 that processes z-lines to reduce the artifact.

FIG. 3 illustrates another example of the artifact reducer 124. In this embodiment, the data selector 202 selects z-lines from the 3D volumetric image data. The z-lines are formed by choosing a particular x and y coordinate, and taking all the voxels along the z-axis direction in the volume at those coordinates.

A z-line processor 302 generates a copy of the selected z-lines. The z-line processor 302 employs the de-noiser 208 to remove noise (high frequency components) corresponding to structured artifact from the copy of the (or the originally selected) z-lines. In the illustrated embodiment, the de-noised z-lines substitute for the de-noised coronal and sagittal slices described in connection with FIG. 2. A suitable de-noising algorithm includes a one-dimensional (1D) or other de-noising algorithm.

The subtractor 212 subtracts the de-noised copy of the (or originally selected) z-lines from the originally selected (or copy of the) z-lines, forming difference z-lines. The difference z-lines represent the artifacts removed from the original z-lines by de-noising. Again, the subtraction can be simple subtraction or a weighted subtraction.

The reconstructed image data updater 214 replaces the z-lines in the 3D volumetric image data with the difference z-lines. Then, as discussed above, the axial slice processor 210 employs the de-noiser 208 to de-noise the selected axial slices.

The subtractor 212 also subtracts the de-noised axial slices from the 3D volumetric image data with the replacement difference z-lines. Like above, this has the effect of restoring high-frequency components that do not correspond to the structured artifact, restoring visually pleasing components that were removed during de-noising of the coronal and sagittal slices.

In the above example, the de-noised z-lines are used to generate difference z-lines that are substituted in the 3D volumetric image data. In another embodiment, the de-noised z-lines are directly subtracted from the 3D volumetric image data.

In both FIGS. 2 and 3, the artifact reducer 124 reduces substantially only higher frequency components in the z-axis direction that correspond to structured artifacts due to under-sampling in the z-axis direction, such as the windmill artifact, with minimal effect on the resolution of structures or otherwise on the appearance of the image generated with the 3D volumetric image data. In another embodiment, oblique and/or curved slices are additionally and/or alternatively used in place of the coronal and/or sagittal slices.

Figure 4:
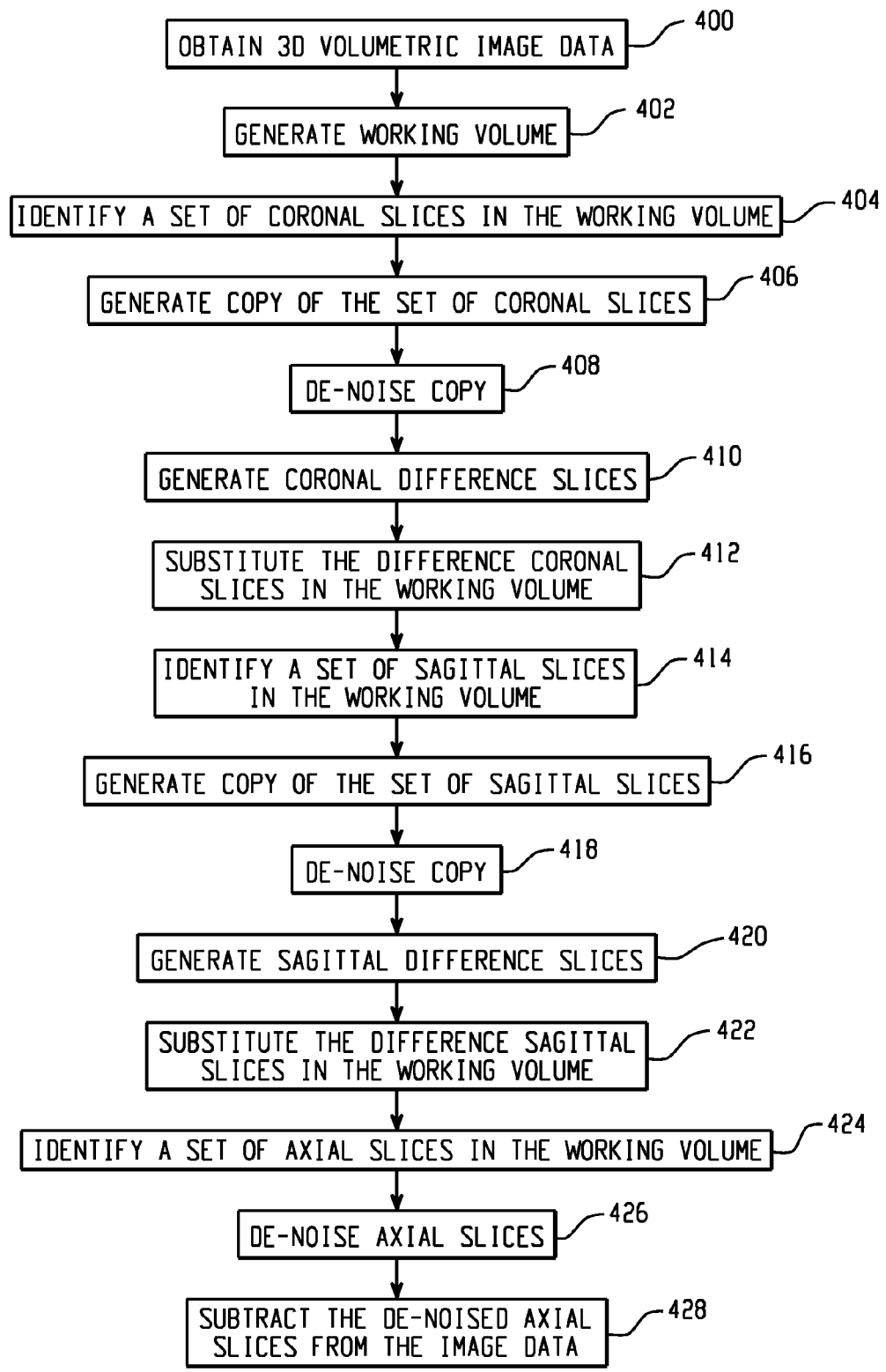
FIG. 4 illustrates a method using the artifact reducer of FIG. 2.

FIG. 4 illustrates an example method for reducing structured artifact based on coronal and sagittal slices. It is to be appreciated that the order of the acts is for explanatory purposes and is not limiting. That is, one or more of the acts can occur early or later in the method. In addition, more acts can be performed and/or some of the acts may be omitted.

At 400, reconstructed projection data (3D volumetric image data) having artifacts with higher frequency components along the z-axis direction and lower frequency components in the x-y plane is obtained.

At 402, a working volume of the 3D volumetric image data is created.

At 404, a set of coronal slices is identified in the working volume.

At 406, a copy of the set of coronal slices is generated.

At 408, the copy of the set of coronal slices is de-noised.

At 410, the de-noised set of coronal slices is subtracted from the copy of the set of coronal slices, forming a difference set of coronal slices.

At 412, the corresponding set of coronal slices in the working volume is replaced with the difference set of coronal slices.

At 414, a set of sagittal slices is identified in the working volume.

At 416, a copy of the set of sagittal slices is generated.

At 418, the copy of the set of sagittal slices is de-noised.

At 420, the de-noised set of sagittal slices is subtracted from the copy of the set of sagittal slices, forming a difference set of sagittal slices.

At 422, the corresponding set of sagittal slices in the working volume is replaced with the difference set of sagittal slices.

At 424, after the coronal and sagittal difference slices are inserted into the working volume, a set of axial slices is identified in the working volume.

At 426, the selected axial slices are de-noised.

At 428, the de-noised set of axial slices is subtracted from the original 3D volumetric image data.

As discussed herein, the resulting 3D volumetric image data has reduced structured artifact relative to the initial 3D volumetric image data.

Figure 5:
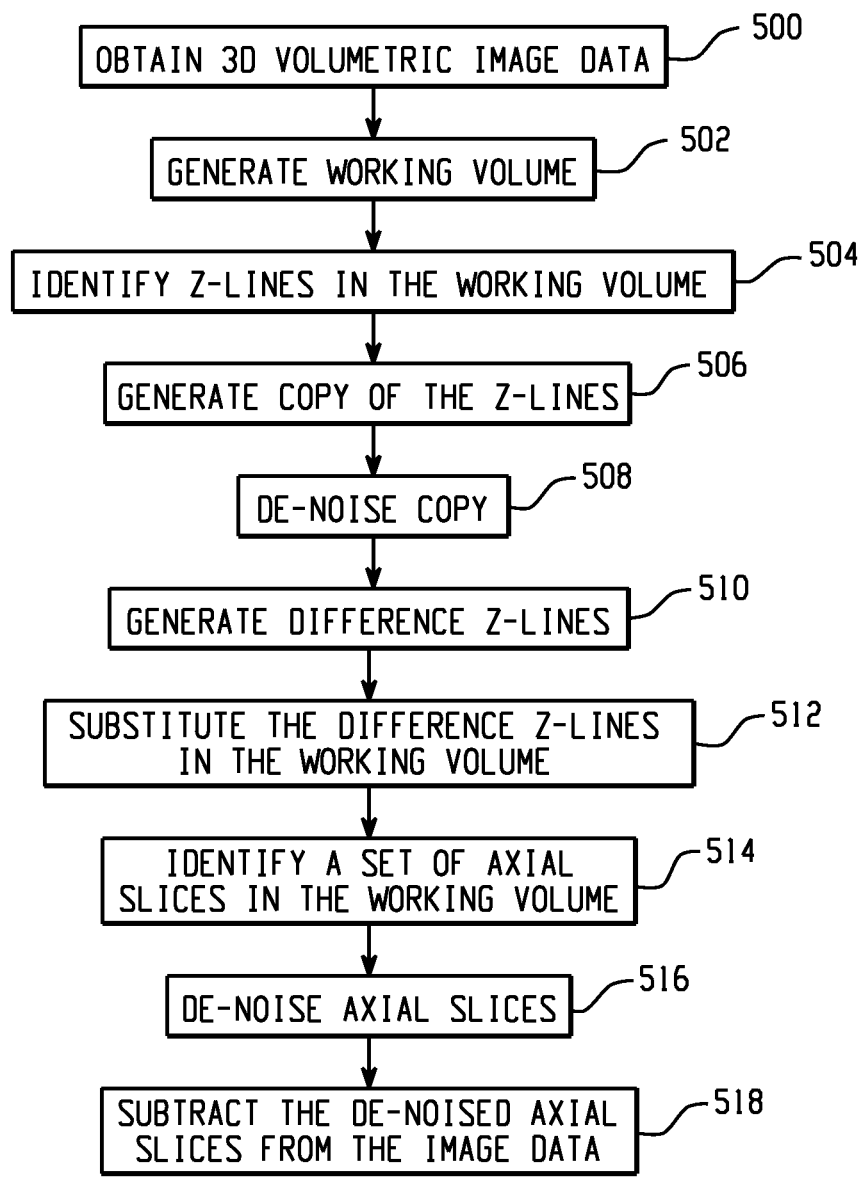
FIG. 5 illustrates a method using the artifact reducer of FIG. 3.

FIG. 5 illustrates another example method for reducing structured artifact based on z-lines. It is to be appreciated that the order of the acts is for explanatory purposes and is not limiting. That is, one or more of the acts can occur early or later in the method. In addition, more acts can be performed and/or some of the acts may be omitted.

At 500, reconstructed projection data (3D volumetric image data) having artifacts with higher frequency components along the z-axis direction and lower frequency components in the x-y plane is obtained.

At 502, a working volume of the 3D volumetric image data is created.

At 504, a set of z-lines is identified in the working volume.

At 506, a copy of the set of z-lines is generated.

At 508, the copy of the set of z-lines is de-noised.

At 510, the de-noised set of z-lines is subtracted from the copy of the set of z-lines, forming a difference set of z-lines.

At 512, the corresponding set of z-lines in the working volume is replaced with the difference set of z-lines.

At 514, after the difference set of z-lines is inserted into the working volume, a set of axial slices is identified in the working volume.

At 516, the selected axial slices are de-noised.

At 518, the de-noised set of axial slices is subtracted from the original 3D volumetric image data.

Again, the resulting 3D volumetric image data has reduced structured artifact relative to the initial 3D volumetric image data.

The artifact reducer 124 described herein can be used with medical and non-medical imaging systems such as low- and high-end CT scanners, including legacy, current, and next generation scanners. This includes CT scanners with tubes capable of or not capable of focal spot movement in either the z-axis or x-y direction. It also includes other systems, such as C-arm x-ray devices, which are capable of tomographic imaging. Applications include general radiology, including protocols with thin-slice images (e.g., CT-Angiography, bone/orthopedic imaging, etc.).

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
    reducing structured artifacts in 3D volumetric image data, which is generated with reconstructed projection data produced by an imaging system, by processing the 3D volumetric image data along a z-axis direction, wherein the 3D volumetric image data includes structured artifacts which have high-frequency components in the z-axis direction, and lower-frequency components within the x-y plane, the processing, comprising:
    de-noising a copy of a set of coronal slices in a working volume of the 3D volumetric image data;
    generating a set of difference coronal slices by subtracting the set of de-noised coronal slices from the copy of the set of coronal slices;
    substituting the difference coronal slices for the set of coronal slices in the working volume;
    de-noising a copy of a set of sagittal slices in working volume;
    generating a set of difference sagittal slices by subtracting the set of de-noised sagittal slices from the copy of the set of sagittal slices;
    substituting the difference sagittal slices for the set of coronal slices in the working volume;
    de-noising a copy of a set of axial slices in the working volume after substituting the coronal and sagittal difference slices in the working volume; and subtracting the set of de-noised axial slices from the 3D volumetric image data.

2. The method of claim 1, wherein the structured artifacts correspond to undersampling in the z-axis direction.

3. The method of claim 1, wherein the structured artifacts are windmill artifacts.

4. The method of claim 1, wherein the z-axis resolution of the processed 3D volumetric image data is the same as the z-axis resolution of the unprocessed 3D volumetric image data.

5. The method of claim 1, wherein the processing includes de-noising the 3D volumetric image data.

6. The method of claim 1, wherein the de-noised axial slices restore higher frequency components, including noise, that do not correspond to the structured artifacts.

7. The method of claim 1, further comprising:
de-noising a copy of a set of z-lines in a working volume of the 3D volumetric image data;
generating a set of difference z-lines by subtracting the set of de-noised z-lines from the copy of the set of z-lines;
substituting the set of difference z-lines for the set of z-lines in the working volume;
de-noising a copy of a set of axial slices in the working volume after substituting the set of difference z-lines in the working volume; and
subtracting the set of de-noised axial slices from the 3D volumetric image data.

8. The method of claim 7, wherein the de-noised axial slices restore higher frequency components that do not correspond to the structured artifacts.

9. The method of claim 1, wherein the processing reduces higher frequency artifact components along the z-axis.

10. The method of claim 1, wherein the processing reduces higher frequency artifact components along in the x-y plane.

11. The method of claim 1, wherein the imaging system includes a radiation source not configured for focal spot shifting.

12. A non-transitory computer readable storage medium containing instructions which, when executed by a computer, cause the computer to perform the act of:
processing 3D volumetric image data along a z-axis direction to remove higher frequency components corresponding to structured artifacts to reduce the structured artifacts in the 3D volumetric image data, wherein the 3D volumetric image data is generated with reconstructed projection data produced by an imaging system, the processing, comprising:
generating a set of de-noised z-lines by de-noising a set of z-lines in a working volume of the 3D volumetric image data;
generating a set of z-line differences by subtracting the de-noised set of z-lines from the set of z-lines in the copy in the working volume;
replacing the set of z-lines in the working volume with the z-lines difference slices;
de-noising a set of axial slices of the working volume after replacing the set of z-line differences in the working volume; and
subtracting the set of de-noised axial slices from the 3D volumetric image data.

13. The non-transitory computer readable storage medium of claim 12, wherein the structured artifact is windmill artifact.

14. The non-transitory computer readable storage medium of claim 12, wherein the storage medium further contains instructions which, when executed by the computer, cause the computer to perform the acts of:
generating a set of de-noised coronal slices by de-noising a set of coronal slices in a working volume of a copy of the 3D volumetric image data;
generating a set of coronal difference slices by subtracting the de-noised set of coronal slices from the set of coronal slices in the working volume;
replacing the set of coronal slices in the working volume with the coronal differences slices;
generating a set of de-noised sagittal slices by de-noising a set of sagittal slices in the working volume;
generating a set of sagittal difference slices by subtracting the de-noised set of sagittal slices from the set of sagittal slices in the working volume;
replacing the set of sagittal slices in the working volume with the sagittal difference slices;
de-noising a set of axial slices in the working volume after replacing the coronal and sagittal differences slices in the working volume; and
subtracting the set of de-noised axial slices from the 3D volumetric image data.

15. The non-transitory computer readable storage medium of claim 12, wherein the de-noised axial slices restore higher frequency components that do not correspond to the structured artifacts.

16. The non-transitory computer readable storage medium of claim 12, wherein the 3D volumetric image data has artifacts with higher frequency components along the z-axis and lower frequency components along a plane transverse to the z-axis.

17. An artifact reducer, comprising:
a de-noiser processor that de-noises selected first data from a copy of 3D volumetric image data along a z-axis direction and then de-noises selected second data from the copy of the 3D volumetric image data in an x-y plane; and
a subtractor processor that subtracts the de-noised first data from the copy of the 3D volumetric image data prior to selecting and de-noising the data in the x-y plane and that subtracts the de-noised x-y plane data from the 3D volumetric image data after the de-noised z-axis data is substituted into the copy of the 3D volumetric image data,
wherein one of coronal or sagittal slices is de-noised and subtracted from the copy of the 3D volumetric image data and then the other of the coronal or sagittal slices is de-noised and subtracted from the copy of the 3D volumetric image data.

18. The artifact reducer of claim 17, wherein the first data corresponds to z-lines in the copy of the 3D volumetric image data.

19. The artifact reducer of claim 17, wherein the artifact reducer reduces structured artifacts in the 3D volumetric image data.

20. The artifact reducer of claim 17, wherein a z-axis resolution of the 3D volumetric image data before the de-noising and subtractions is the same as a z-axis resolution of the unprocessed 3D volumetric image data after the de-noising and subtractions.

21. The artifact reducer of claim 17, wherein subtracting the de-noised second data from the 3D volumetric image restores higher frequency components that do not correspond to the structured artifacts.

22. The artifact reducer of claim 19, wherein the artifact reducer is part of a reconstructor of an imaging system.

23. A method, comprising:
reducing structured artifacts in 3D volumetric image data, which is generated with reconstructed projection data produced by an imaging system, by processing the 3D volumetric image data along a z-axis direction, wherein the 3D volumetric image data includes structured artifacts which have high-frequency components in the z-axis direction, and lower-frequency components within the x-y plane, the processing, comprising:

de-noising a copy of a set of z-lines in a working volume of the 3D volumetric image data;

generating a set of difference z-lines by subtracting the set of de-noised z-lines from the copy of the set of z-lines;

substituting the set of difference z-lines for the set of z-lines in the working volume;

de-noising a copy of a set of axial slices in the working volume after substituting the set of difference z-lines in the working volume; and subtracting the set of de-noised axial slices from the 3D volumetric image data.

\* \* \* \* \*